United States Patent Office.

JOSEPH W. BARBOUR, OF WINOOSKI FALLS, VERMONT, ASSIGNOR TO HIMSELF AND ELISHA ALLEN, OF SAME PLACE.

Letters Patent No. 108,091, dated October 11, 1870.

IMPROVEMENT IN SHEARS FOR CUTTING FLOWERS.

The Schedule referred to in these Letters Patent and making part of the same

*To all whom it may concern:*

Be it known that I, JOSEPH W. BARBOUR, of Winooski Falls, in the county of Chittenden and State of Vermont, have invented a new and improved Shears for Cutting Flowers, Pruning, &c.; and I do hereby declare that the following is a full, clear, and exact description thereof, which will enable others skilled in the art to make and use the same, reference being had to the accompanying drawing forming part of this specification, in which—

Figure 1 represents a perspective view of my improved shears.

Figure 2 is a transverse section of the same.

Similar letters of reference indicate corresponding parts.

This invention has for its object to so construct shears for the cutting of flowers, herbs, &c., and for pruning purposes, that the pieces cut will be held in said shears and not allowed to drop.

The invention consists in the application of a pair of rubber clamps to the cutters of a pair of shears, so that said clamps will retain and hold the flower, branch, or other piece cut by the shears.

A A in the drawing represents the two cutters of a pair of shears, $a$ being their pivot, and B B their handles.

Upon each cutter is secured a block or plate, $b$, which has its inner edge set back of the cutting-edge, as shown.

A strip of rubber, C, is set into the inner edge of the plate $b$, and has, or may have, a corrugated or roughened face, as shown. If desired, the plates $b$ may be continuations of the handles B, the cutters A being secured to their lower sides.

When the shears are used for cutting flowers, &c., the rubber strips or clamps will retain the pieces cut off, as is clearly indicated in fig. 2. The flowers can thus be preserved from injury, and the handling of such as have thorns is made unnecessary. The rubber plates may, if desired, be applied in any other suitable manner, and leather, or other equivalent material, may be used in place of the rubber.

Having thus described my invention,

I claim as new and desire to secure by Letters Patent—

The shears, containing the elastic plates or pieces C, for retaining the flowers or other things cut by them, substantially as set forth.

JOSEPH W. BARBOUR.

Witnesses:
PETER LECLAIR.
G. M. DUNCAN.

H. Barrett,
Polishing Machine.
No. 108,092.      Patented Oct. 11, 1870.
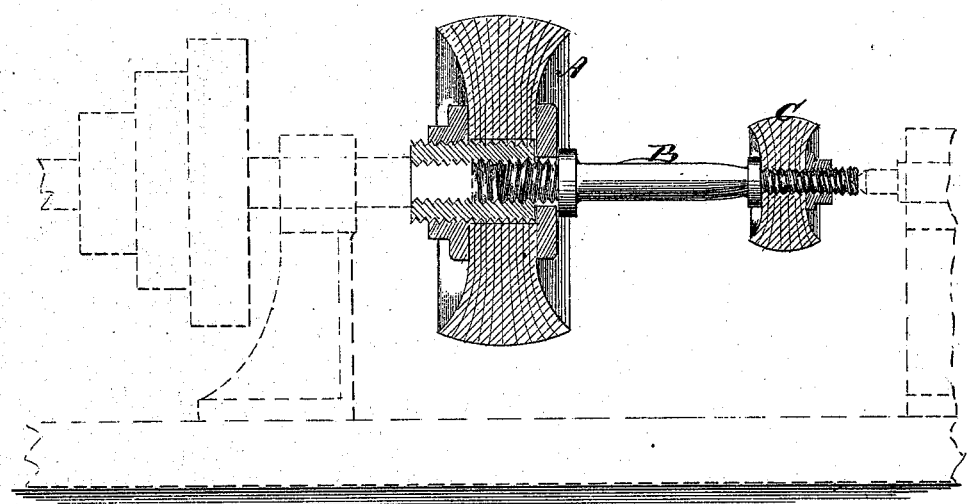
Witnesses:
Geo. N. Mabee
Alex. H. Roberts
Inventor:
H. Barrett
per Mmm & Co
Attorneys.